US008468488B1

(12) United States Patent
Burstein

(10) Patent No.: US 8,468,488 B1
(45) Date of Patent: Jun. 18, 2013

(54) METHODS OF AUTOMATICALLY PLACING AND ROUTING FOR TIMING IMPROVEMENT

(75) Inventor: Michael Burstein, Cupertino, CA (US)

(73) Assignee: Golden Gate Technology, Inc., San Jose, CA (US)

(*) Notice: Subject to any disclaimer, the term of this patent is extended or adjusted under 35 U.S.C. 154(b) by 94 days.

(21) Appl. No.: 13/149,258

(22) Filed: May 31, 2011

Related U.S. Application Data

(60) Provisional application No. 61/349,794, filed on May 28, 2010.

(51) Int. Cl.
G06F 17/50 (2006.01)

(52) U.S. Cl.
USPC ............ 716/134; 716/113; 716/119; 716/126

(58) Field of Classification Search
USPC ................. 716/110–111, 113, 118–119, 126, 716/130, 132, 134
See application file for complete search history.

(56) References Cited

U.S. PATENT DOCUMENTS

| 4,703,435 | A  | * | 10/1987 | Darringer et al. | 716/103 |
| 5,426,591 | A  | * | 6/1995 | Ginetti et al. | 716/104 |
| 6,272,668 | B1 | * | 8/2001 | Teene | 716/113 |
| 6,385,761 | B1 | * | 5/2002 | Breid | 716/104 |
| 6,587,107 | B2 | * | 7/2003 | Rayner | 345/428 |
| 6,769,110 | B2 | * | 7/2004 | Katoh et al. | 716/108 |
| 6,813,753 | B2 | * | 11/2004 | Jones | 716/113 |
| 6,922,817 | B2 | * | 7/2005 | Bradfield et al. | 716/113 |
| 7,017,131 | B2 | * | 3/2006 | Barnes | 716/113 |
| 7,076,755 | B2 | * | 7/2006 | Ren et al. | 716/123 |
| 7,137,093 | B2 | * | 11/2006 | Harn | 716/113 |
| 2001/0049815 | A1 | * | 12/2001 | Shinomiya et al. | 716/11 |
| 2003/0023938 | A1 | * | 1/2003 | Nagasaka et al. | 716/2 |
| 2007/0234266 | A1 | * | 10/2007 | Chen et al. | 716/13 |
| 2009/0183132 | A1 | * | 7/2009 | Izuha et al. | 716/10 |

* cited by examiner

Primary Examiner — Stacy Whitmore
(74) Attorney, Agent, or Firm — The Law Offices of Andrew D. Fortney; Andrew D. Fortney

(57) ABSTRACT

Methods and software for methods and software for placing and routing a signal path in an integrated circuit layout are disclosed. The signal path generally includes a plurality of cells and combinational paths having at least one net between said cells. The method includes determining whether an adjacent cell can be swapped with a selected cell (e.g., where the selected cell is one of the cells of the signal path and the adjacent cell is adjacent to the selected cell in the layout), determining whether a delay of the signal path decreases after swapping positions of the adjacent cell and the selected cell, and determining whether swapping the adjacent and selected cells causes a timing violation in another signal path of the layout. The present invention advantageously provides an automated method of improving the timing characteristics of poorly performing signal paths, without causing timing violations in other signal paths in the same integrated circuit.

20 Claims, 8 Drawing Sheets

US 8,468,488 B1

METHODS OF AUTOMATICALLY PLACING AND ROUTING FOR TIMING IMPROVEMENT

RELATED APPLICATIONS

This application claims the benefit of U.S. Provisional Patent Application No. 61/349,794, filed May 28, 2010, and incorporated herein by reference in its entirety.

FIELD OF THE INVENTION

The present invention generally relates to the field of circuit design, particularly integrated circuit (IC) design. More specifically, embodiments of the present invention pertain to methods, algorithms, software, systems, and architectures for automatically improving the timing characteristics of integrated circuit signal paths.

DISCUSSION OF THE BACKGROUND

In typical circuit design, circuit components are arranged to optimize space and/or circuit performance. Such arrangements can include the "layout" or pattern definition of each of the layers used in a semiconductor manufacturing process. For example, such layout(s) can include metal interconnect layers or metal connectivity layers that are converted to masks or reticles for use in a wafer fabrication facility that manufactures ICs (e.g., "chips").

While some circuits are designed using "custom" layout processes, others are designed using a partially or fully automated design flow. Application-Specific Integrated Circuit (ASIC) designs, as well as other functional blocks within a larger chip, such as System-On-Chip (SOC) designs, may employ custom and/or ASIC type flows on the same chip. In any event, typical ASIC flows use "place-and-route" tools for placing logic or circuit "blocks" and then "routing" or connecting the interface signals between the blocks. Such routing between circuit blocks is typically done using one or more metal connectivity layers for each signal path. In most modern ASIC designs, at least five layers of metal connectivity (and typically, six to eight layers) are employed.

Referring now to FIG. 1A, a logical diagram of a typical signal path is shown. A signal path generally has a plurality of circuit blocks (e.g., circuit blocks 101-105) with "nets" or wires 111-114 communicatively coupled between circuit blocks. A signal path generally has flip-flops or other state memory devices at each end of the path (e.g., circuit blocks 101 and 105), with logic gates or other logical operation circuit blocks between the flip-flops (e.g., circuit blocks 102-104). Typically, a signal path is designed and/or required to propagate a signal from a beginning flip-flop 101 to an ending flip-flop 105 during one clock pulse. Therefore, when the circuit blocks and nets of a signal path are placed and routed on an integrated circuit device, the propagation delay of the wires that form the nets must be taken into account.

In conventional place-and-route flows, circuit blocks or "cells" are first placed in desired locations and sized (e.g., had their drive strength adjusted by changing transistor sizes and/or adding buffer stages) in accordance with a projected routing and capacitive load based on these desired cell locations. Then, signals are actually routed between the circuit blocks. A standard cell is a specific design for each gate in the library. With advancements in integrated circuit fabrication processes, the routing area is becoming relatively more important than the total number of transistors used with respect to the overall area of ASIC designs. Since the majority of ASIC routing is performed automatically, standard cell sizes are generally used to support place-and-route tools. Thus, referring now to FIG. 1B, circuit blocks 101-105 may be placed into cells of integrated circuit layout 120, where the height of each cell in rows R1 through R6 is the same. Although nets 111-114 are shown as straight logical interconnections between circuit blocks 101-105, wires are typically placed on horizontal and vertical wire tracks in the layout.

After wires are placed, the timing of the signal path is generally evaluated. Typically, capacitances of the actual resultant signal paths are extracted and provided to a simulator and/or timing closure tool. If the circuit meets the timing specifications for the design, timing closure has been obtained. However, if the circuit fails timing closure, adjustments to the circuit block placement and/or routing must be done. This process must be repeated until timing closure is met, delaying the completion of the overall design. In particular, overdriven signals or signals with relatively long paths resulting from such conventional solutions are susceptible to hold time violations. The signal paths must then be re-routed and/or the cells re-sized as part of one or more iterations in order to ultimately meet the timing constraints.

Given the increasing demands on circuit designers to more quickly create chips of increasing density, decreasing wire and transistor widths, and decreasing power supply and power consumption, it is difficult to ensure optimal cell sizing in an automated place-and-route flow. Increasing the complexity, flexibility, and/or functionality of the circuitry on a chip exacerbates these challenges. Therefore, it is desirable to provide methods for automatically improving the timing characteristics of poorly performing signal paths without thereby causing timing violations in other signal paths on the same integrated circuit device.

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY OF THE INVENTION

Embodiments of the present invention relate to methods and software for placing and routing a signal path in an integrated circuit layout. The signal path generally includes a plurality of integrated circuit cells ("cells") and combinational paths having at least one net between the cells. The method includes determining whether an adjacent cell can be swapped with a selected cell in the integrated circuit (e.g., where the selected cell is one of the cells of the signal path, and the adjacent cell is adjacent to the selected cell in the layout), determining a difference in the delay of the signal path as a result of swapping positions of the adjacent cell and the selected cell, and determining whether swapping the positions of the adjacent cell and the selected cell causes a timing violation in one or more other signal paths of the layout.

Cells may be swappable if they are adjacent to each other in the same row (e.g., no other cells in the row will have to be moved to accommodate the swap). If the selected cell and the adjacent cell are in different (but adjacent) cell rows, however, then they may be swappable if both cells have the same width or a same available area. In one embodiment, determining whether an adjacent cell can be swapped with the selected cell comprises determining whether nets coupled to the adjacent cell and the selected cell can be routed after performing the swap (e.g., determining whether there is room in the layout [for example, in the wire track space] to accommodate the new routing).

In another embodiment, determining the difference in the delay of the signal path comprises determining whether one or more nets coupled to the selected cell is shorter after the swap. In still another embodiment, determining the difference in the delay of the signal path comprises determining whether a total length of the nets coupled to the selected cell is shorter after the swap. Alternatively, the method may determine whether a predetermined parameter (e.g., capacitance, resistance, inductance, etc.) is lower after the swap.

In some embodiments, the method includes obtaining an initial placement of each of the cells of the signal path and an initial routing of each of the nets of the signal path before the determining whether the adjacent cell can be swapped with the selected cell. For example, the method may further include placing the cells in a layout and routing wires corresponding to the nets. Alternatively, the method may further include retrieving (i) a predetermined cell placement and/or layout, and/or (ii) a predetermined routing of the wires corresponding to the nets.

In an exemplary embodiment, the method includes determining boundary characteristics for nets in the other signal paths of the integrated circuit. These boundary characteristics of the nets may include, for example, maximum capacitance(s) of the nets. Alternatively, the characteristics may include one or more parameters such as resistance, wire length, inductance, etc. In another embodiment, determining whether performing the swap would cause timing violations includes calculating new characteristics for affected nets in the other signal paths (e.g., nets that are re-routed to accommodate the swap), and determining whether the new characteristics are within the boundary characteristics for the affected nets (e.g., determining whether the capacitances of the affected nets after re-routing are below one or more maximum capacitance[s]). Thus, the method may also include determining new routes of nets in the layout in accordance with the swap (e.g., re-routing nets coupled to the selected and adjacent cells, as well as re-routing nets in other signal paths to accommodate the swap).

The present method is particularly advantageous for improving the timing of pre-placed and pre-routed signal paths. Thus, the present invention also relates to determining whether a signal path (e.g., a signal path that has been placed and routed by conventional means) violates a timing constraint and, if the signal path violates the timing constraint, performing the present method(s) on the signal path.

The methods described herein may be embodied in software as a computer readable medium or waveform comprising a computer executable set of instructions. In an exemplary embodiment of the software, obtaining an initial placement of each of the circuit blocks of the signal path and an initial routing of each of the nets of the signal path comprises reading and parsing an input file. In one example, the input file may comprise a Design Exchange Format (DEF) file. Alternatively, the software may include instructions for performing an initial placement and routing of cells and nets based on a netlist interface file, such as Verilog Hardware Description Language (VHDL) or Very-High-Speed Integrated Circuit (VHSIC) Hardware Description Language.

In another embodiment, the software includes instructions adapted to determine new routes of nets in the layout in accordance with the cell swap. Thus, the software may further comprise instructions adapted to produce an output file containing the new routes (e.g., as a DEF, LEF, GDSII, or OASIS output file).

Thus, the present invention provides methods and software for placing and routing (or re-placing and re-routing) one or more signal paths in an integrated circuit layout. The present invention advantageously provides for improving the timing characteristics of signal paths in a computationally efficient manner.

These and other advantages of the present invention will become readily apparent from the detailed description of various embodiments below.

DETAILED DESCRIPTION

Figure 1A:
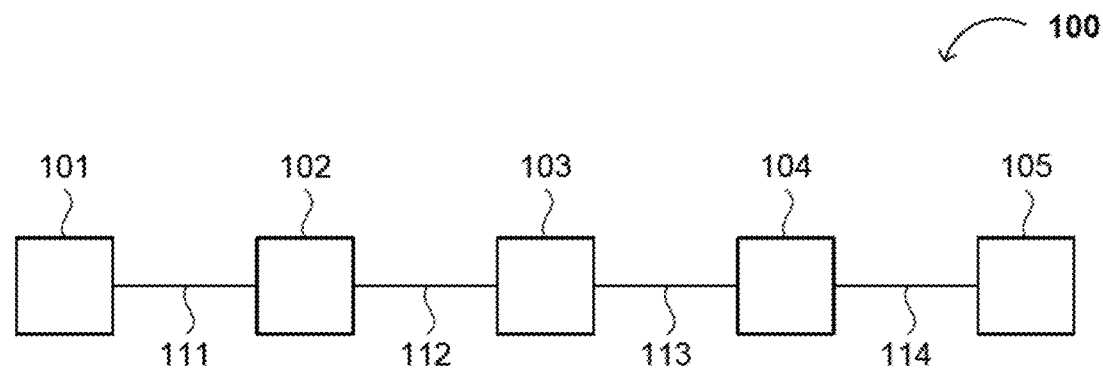
FIG. 1A is a diagram showing a logical view of a signal path.

Reference will now be made in detail to various embodiments of the invention, examples of which are illustrated in the accompanying drawings. While the invention will be described in conjunction with the following embodiments, it will be understood that the description is not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, data streams, or waveforms within a computer, processor, controller, and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, in the context of this application, the terms "net list" (or "netlist") and "hardware description" may be used interchangeably to refer to a circuit design represented in an appropriate language, such as VERILOG simulation language, Hardware Description Language (HDL), Very-High-Speed Integrated Circuit (VHSIC) Hardware Description Language or VERILOG HDL (VERILOG is a registered trademark of Gateway Design Automation Corporation for computer aided electrical engineering programs). Similarly, the terms "routing" and "placement" may be used together or interchangeably to refer to a placement of integrated circuit cells and/or a routing of nets between cells, which may be represented in an appropriate language such as the Design Exchange Format (DEF), LEF, GDSII, or OASIS.

The terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, as may (a) the terms "flip-flop," "latch" and "register," and (b) the terms "connected to," "coupled with," "coupled to," and "in communication with," but these terms are generally given their art-recognized meanings herein.

The invention, in its various aspects, will be explained in greater detail below with regard to exemplary embodiments.

A First Exemplary Method

Figure 1B:
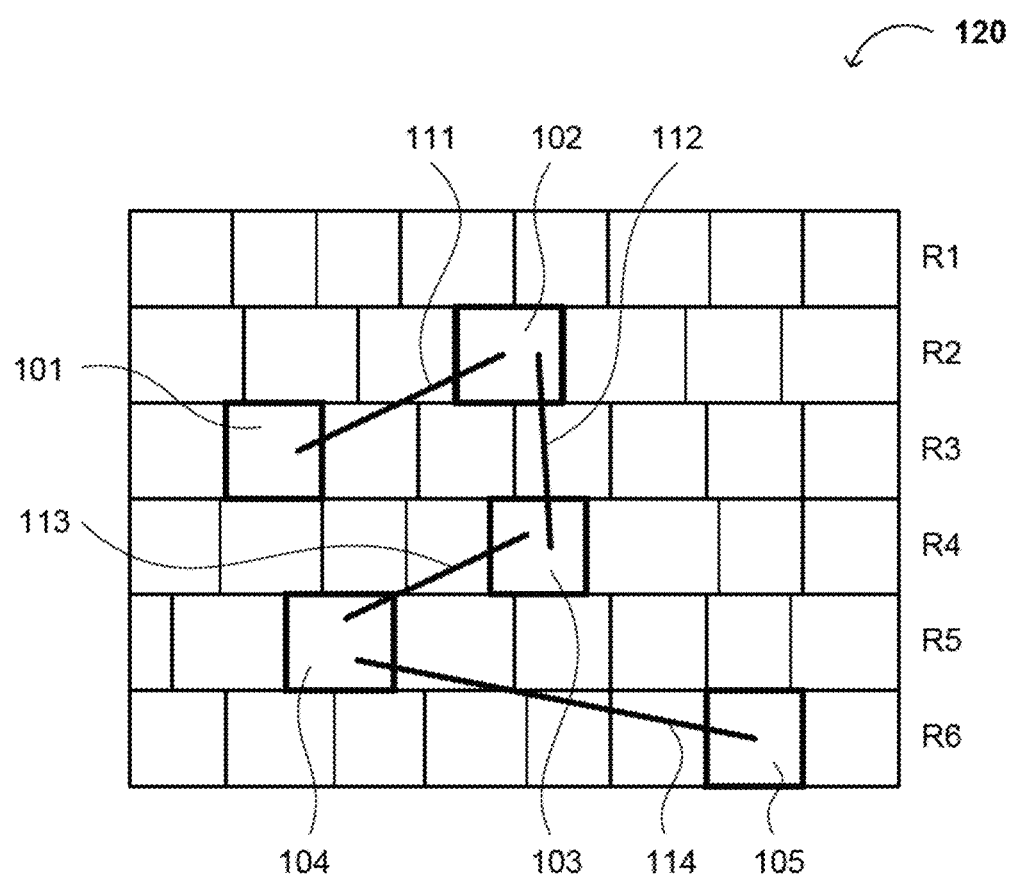
FIG. 1B is diagram showing an exemplary placement of components and nets in a signal path.

In one aspect, the present invention relates to a method for placing and routing a signal path in an integrated circuit layout. The signal path generally includes a plurality of integrated circuit cells (e.g., cells 101-105 of FIGS. 1A-B) and combinational paths having at least one net between the cells (e.g., nets 111-114 of FIGS. 1A-B).

Figure 2:
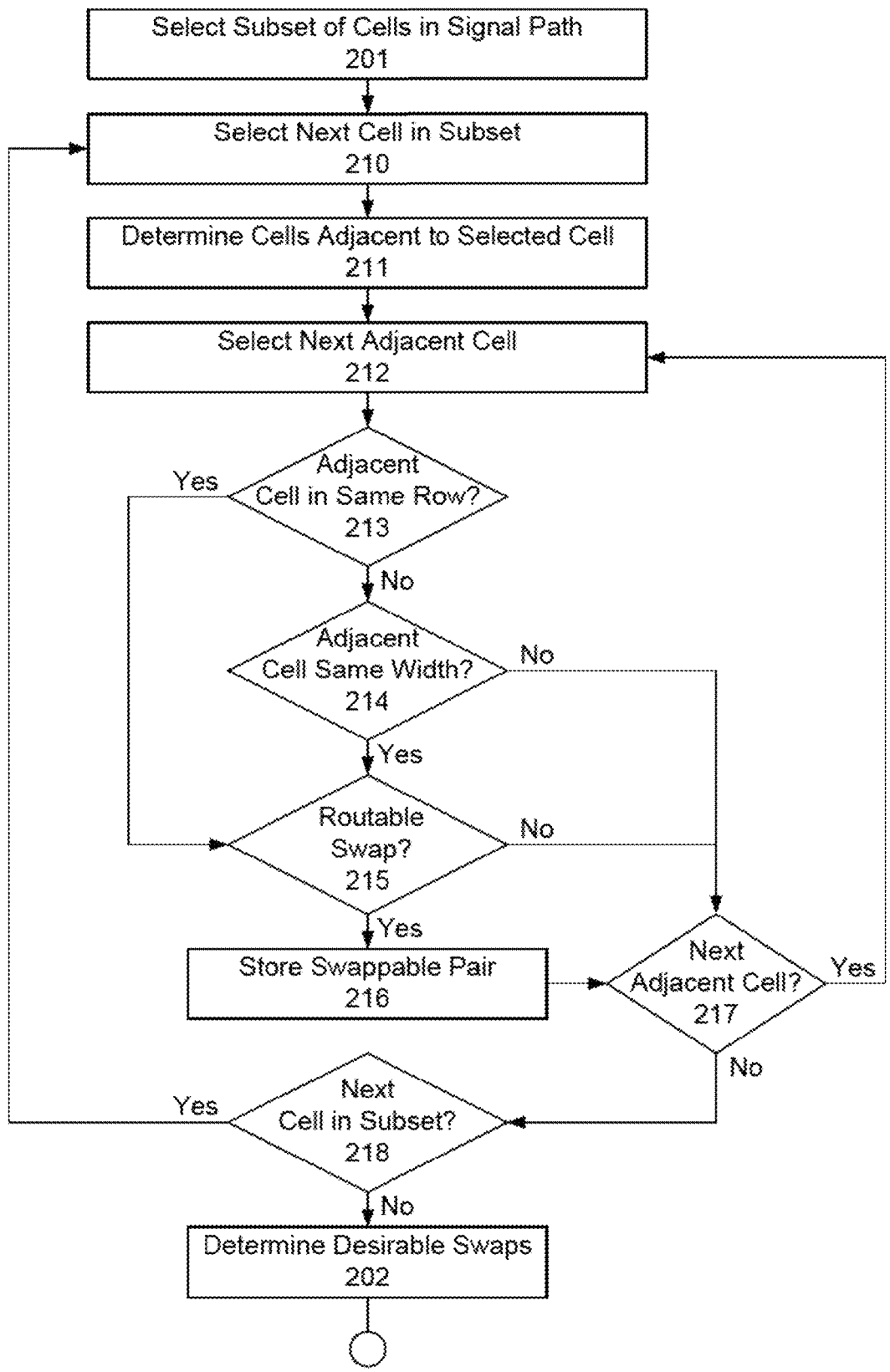
FIG. 2 is a flow chart showing an exemplary method according to the present invention.
Figure 3A:
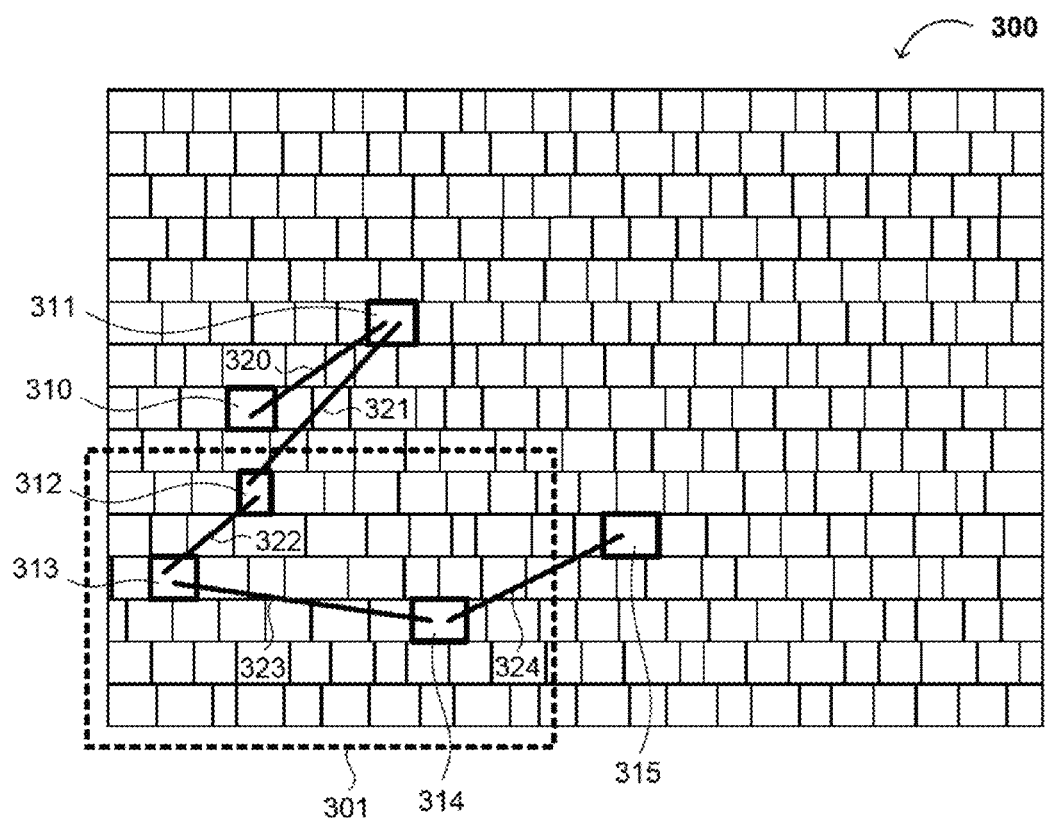
FIGS. 3A-3D are diagrams showing an exemplary placement of components and/or nets in a signal path in a sub-region of a semiconductor die.
Figure 3B:
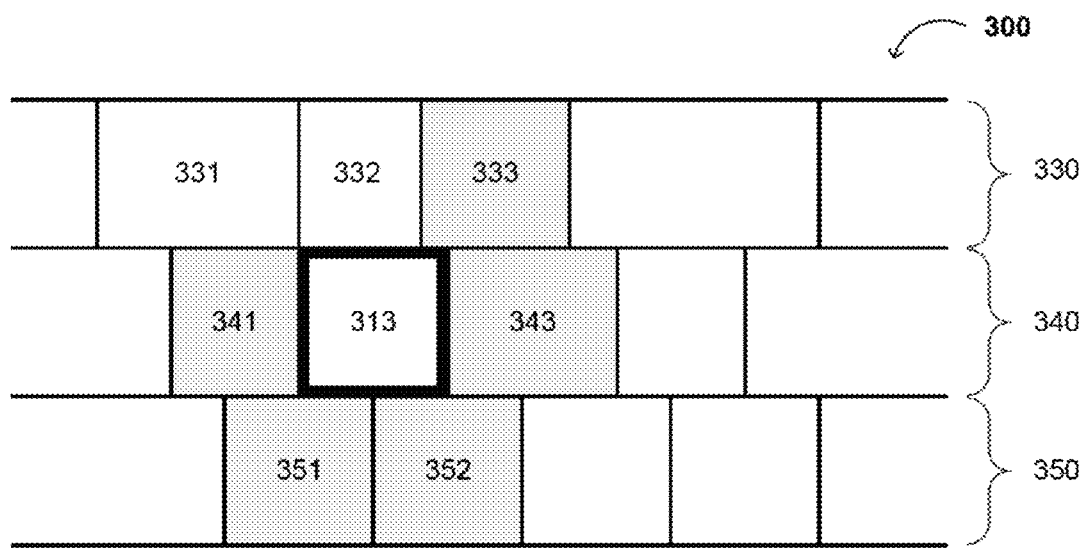
Figure 3C:
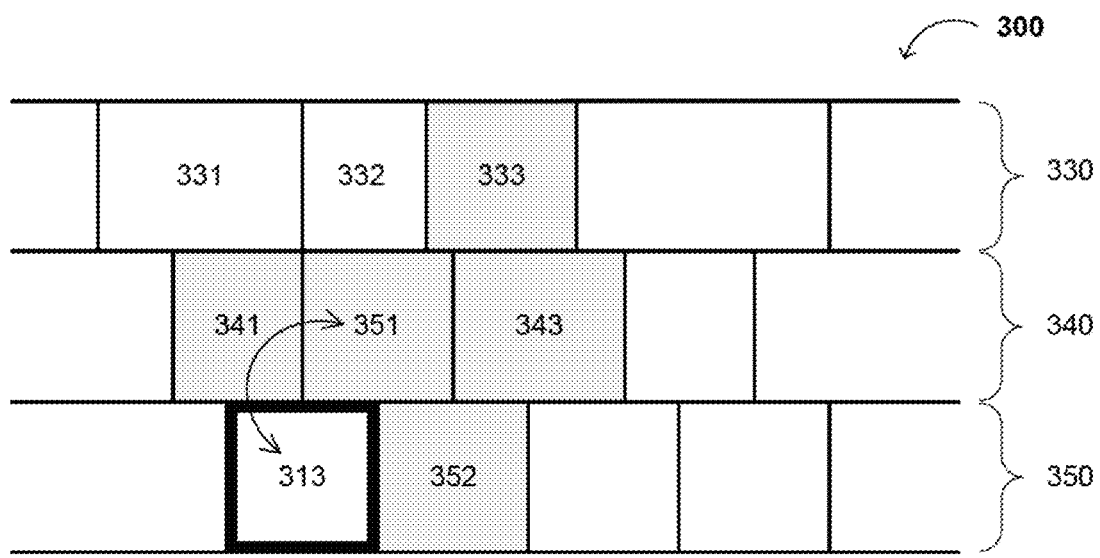
Figure 3D:
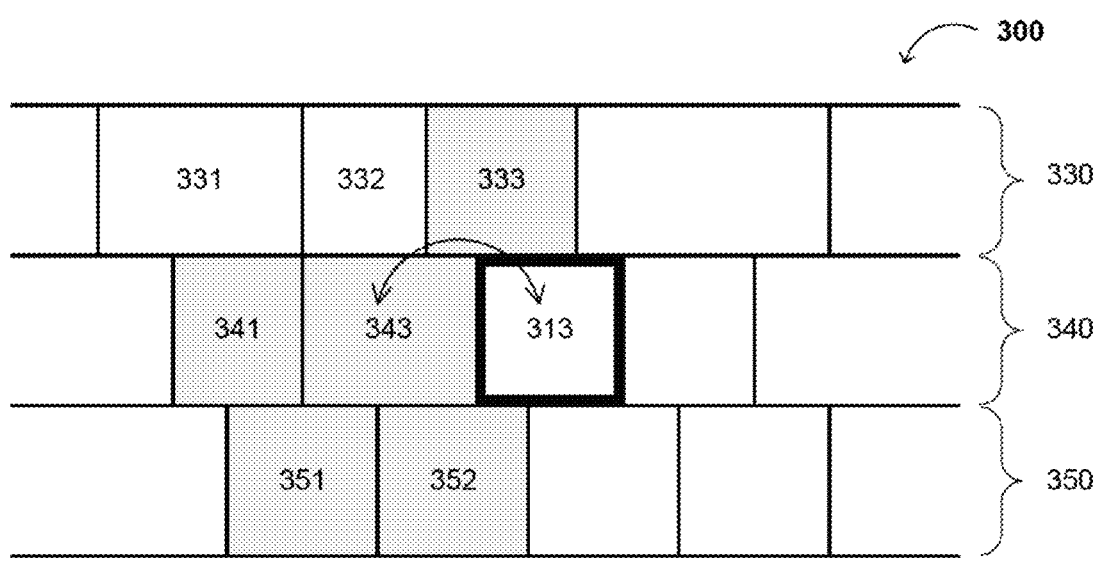

FIG. 2 shows a flow chart of an exemplary method according to the present invention. Generally, the flow defined by 201-218 iterate through a subset of cells in the signal path (e.g., using loop 210-218) and through the cells adjacent to each cell in the subset (e.g., using sub-loop 212-217) to determining whether each cell in the subset can be swapped with adjacent cells. Then, at 202, the method comprises determining which swaps are favorable or desirable by, for example, determining whether the timing of the signal path is improved by performing a swap between a selected cell of the signal path and an adjacent cell, and determining whether performing the swap causes timing violations in one or more other signal paths of the layout.

First, at 201, a subset of cells in the signal path is selected. The subset of cells may include, for example, all of the cells of the signal path that are in a particular region of a semiconductor layout. Referring now to FIG. 3, an exemplary integrated circuit layout 300 is shown. Layout 300 has cell region 301 and a signal path including cells 310-315 and nets 320-324. Thus, selecting a subset of cells in the signal path may comprise selecting cells 312-314 in region 301 of the layout 300.

Referring again to FIG. 2, an iterative loop defined at least in part at 210-218 operates on each of the cells in the subset (e.g., on cells 312-314 in FIG. 3). In the first iteration of loop 210-218 (FIG. 2), the first cell in the subset is selected at 210, and in subsequent iterations of the loop, a subsequent or next cell in the subset is selected at 210. At 211, the cells adjacent to the currently selected cell are identified and/or determined. Referring now to FIG. 3B, the cells around cell 313 are in layout 300 are shown. Accordingly, if the currently selected cell is cell 313, then at 211 in FIG. 2, it is determined that cells 331, 332, 333, 341, 343, 351, and 352 are adjacent to cell 313.

An iterative sub-loop defined at least in part at 212-217 operates on each of the cells adjacent to the currently selected cell. Sub-loop 212-217 generally determines whether each adjacent cell can be swapped with the currently selected cell. At 212, one of the adjacent cells is selected. At 213, the method determines whether the selected adjacent cell is in the same cell row as the currently selected cell of the signal path. Generally, adjacent cells in the same row can be swapped without moving any other cells in the row. Meanwhile, adjacent cells in different rows can be swapped (without moving any other cells) if the widths of the cells are substantially the same. Alternatively, if the selected cell and adjacent cell in a different row have different sizes, the pair will be considered swappable if there is enough unused or unoccupied area in the row of the smaller cell (e.g., adjacent to the smaller cell) so that the combined unused area and smaller cell area are greater than or equal to the area of the larger cell.

Accordingly, if it is determined at 213 that the currently selected cell (e.g., cell 313 in row 340) is not in the same row as the current adjacent cell being considered (e.g., for any of the adjacent cells 331-333 in row 330 and adjacent cells 351-352 in row 350), then the method determines whether the adjacent cell has the same width as the currently selected cell at 214. For example, referring now to FIG. 3C, selected cell 313 can be physically swapped with adjacent cell 351 without moving any other cells because they have substantially the same width. However, in one embodiment, selected cell 313 is not physically swappable with adjacent cell 332 (see, e.g., FIG. 3B) because cell 332 has a different width, and performing the swap might require that row 330 be re-placed or rearranged. In this embodiment, if the cells do not have substantially the same width, then the sub-loop 212-217 for the selected adjacent cell ends at 217. However, if at 214 the cells have substantially the same width, then the method determines whether the swap is routable at 215. Alternatively, if row 330 has sufficient unused or unoccupied area for the sum of the unused or unoccupied area and the area of cell 332 to be greater than the area of cell 313, cell 313 and cell 332 can be swapped. When the unused or unoccupied area in row 330 is not immediately adjacent to cell 332, other cells in the row 330 may need to be shifted or re-placed. In a further embodiment, if the sum of the widths of the unused or unoccupied area and cell 332 is greater than the width of cell 313, cell 313 and cell 332 may be swapped.

If it is determined at 213 that the currently selected cell is in the same row as the adjacent cell being considered (e.g., as is the case for adjacent cells 341 and 343 in FIG. 3B sharing row 340 with selected cell 313), then the cells may be physically swappable, regardless of their relative widths. For example, referring now to FIG. 3D, selected cell 313 may be physically swapped with adjacent cell 343 without moving any other cells.

At 215 in FIG. 2, the method determines whether the nets coupled to the current adjacent cell and the selected cell can be routed after performing the swap. Generally, an integrated circuit has a limited number of metal layers for routing wires (e.g., in wire tracks in the layout). The lowest metal layers are generally used for interconnections within the cells (e.g., for interconnecting individual semiconductor devices within the cells). Higher metal layers are generally used to interconnect cells (e.g., as nets in signal paths). The metal layers above an individual cell may contain wires interconnecting many other cells, which may be distant from that cell. Thus, the method may include determining new wire routes for the nets of the current adjacent cell and the selected cell at 215, and determining whether there is room in the layout (e.g., in wire tracks above and/or between the cells) to accommodate the new routing.

If it is determined that, after the swap, the cells are not routable at 215, then the current iteration of the sub-loop 212-217 is complete, and at 217, it is determined whether there is another adjacent cell to analyze. If the swap is routable, then at 216 the current adjacent cell and the selected cell are stored as a swappable pair (e.g., by adding references to the current adjacent cell and the selected cell to a data structure in a swappable pair list). After the pair is stored, the current iteration of the sub-loop 212-217 is complete.

If, at 217, it is determined that there are no more adjacent cells to analyze, then the current iteration of loop 210-218 is complete, and the method determines whether there are any additional cells in the subset to select. For example, if the subset contains cells 312-314 of FIG. 3A, and the current selected cell is cell 313, then the method may determine that the subset contains another cell to analyze at 218, and returns to 210 to select another cell in the subset (e.g., cell 314). When the current selected cell is 314, the method may determine at 218 that there are no more cells in the subset to analyze, and the method determines whether there are favorable/desirable swaps at 202.

At 202, the method comprises determining which swaps are favorable or desirable by, for example, determining whether the timing of the signal path is improved by the swap between the selected cell in the signal path and an adjacent cell, and determining whether performing the swap causes a timing violation in one or more other signal paths of the integrated circuit layout. Further methods for determining which swaps are favorable or desirable are discussed in more detail with respect to a second exemplary embodiment below.

A Second Exemplary Method

Figure 4:
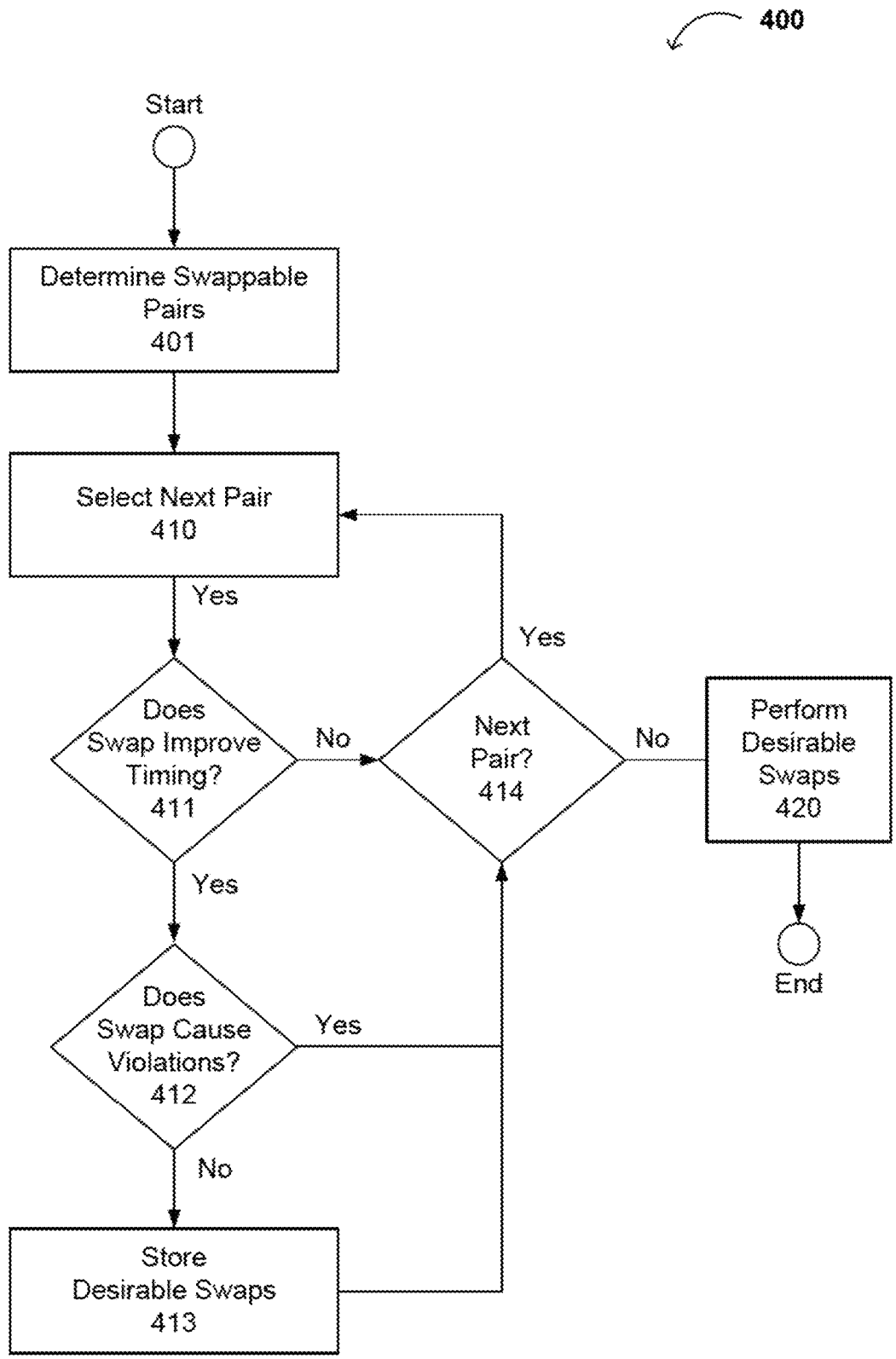
FIG. 4 is a flow chart showing another exemplary method according to the present invention.

Referring now to FIG. 4, a method 400 for placing and routing a signal path in an integrated circuit layout is shown. At 401, swappable pairs or cells in the signal path are determined. This may comprise, for example, loop 201-218 of FIG. 2 to determine which adjacent cells can be physically swapped with cells of the signal path. Alternatively, 401 may comprise retrieving a data structure (e.g., by reading an input file) listing cells that could be swapped with one or more cells of the signal path.

An iterative loop 410-414 can determine whether it is desirable to swap each swappable pair of cells. It will be recognized that one cell in the signal path may be swappable with multiple cells. Therefore, the method may also include determining which of a plurality of possible swaps is most favorable or desirable. At 410, in the first iteration of loop 410-414, the first swappable pair may be selected from the list. Thereafter, a subsequent or next swappable pair is selected for analysis at 410.

Figure 5A:
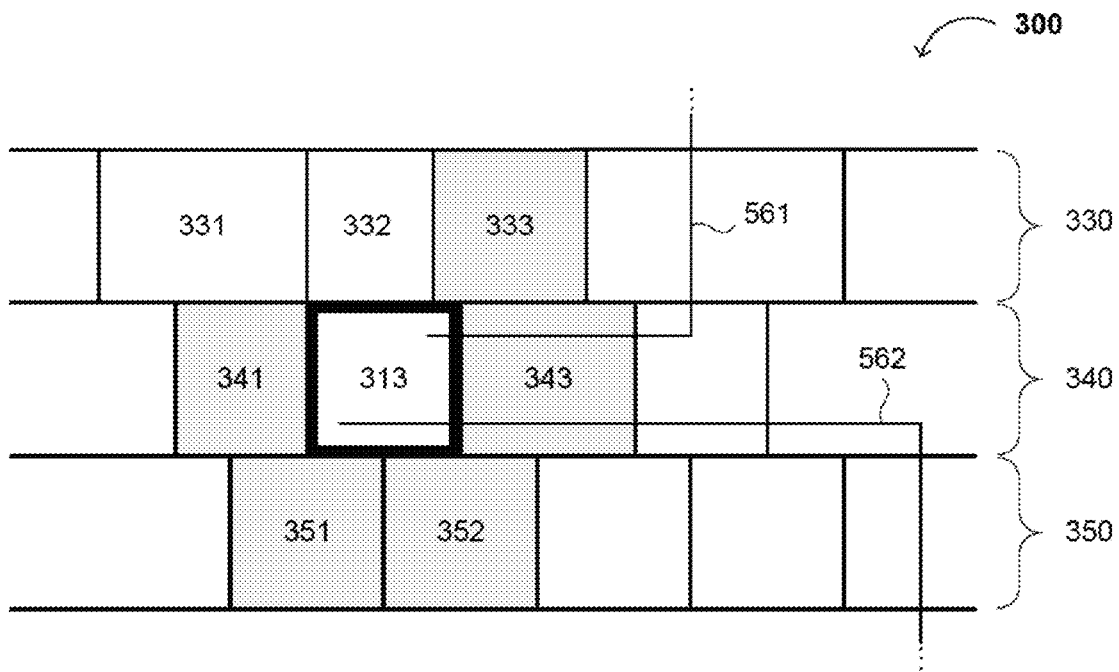
FIGS. 5A-5D are diagrams showing exemplary placements of components and nets in multiple signal paths in a sub-region of a semiconductor die.
Figure 5B:
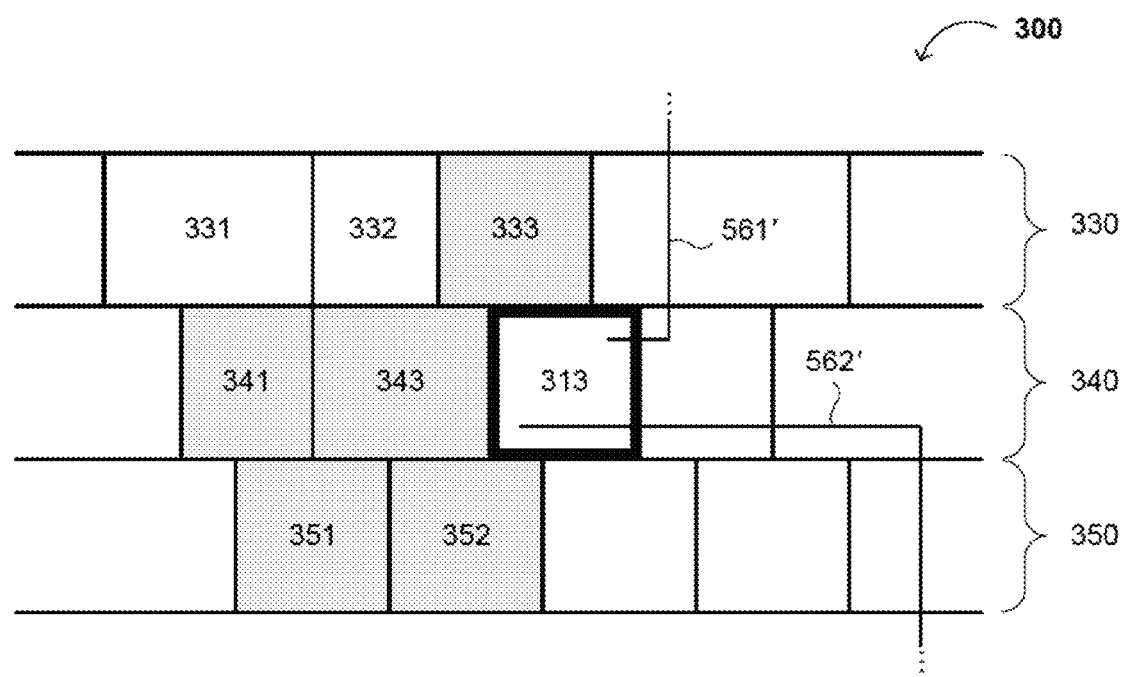

At 411, the method determines whether performing a swap of the current swappable pair improves the timing of the signal path (e.g., whether the swap reduces the total propagation time on the signal path). This may include, for example, determining whether one or more nets coupled to the selected cell are shorter after performing the swap. For example, FIG. 5A shows an exemplary routing of nets 561 and 562 from cell 313, and FIG. 5B shows an exemplary routing of nets 561' and 562' from cell 313 after it is swapped with cell 343. As shown in FIG. 5B, the length of both nets 561' and 562' is decreased by performing the swap, which improves the timing of the signal path containing cell 313.

Figure 5C:
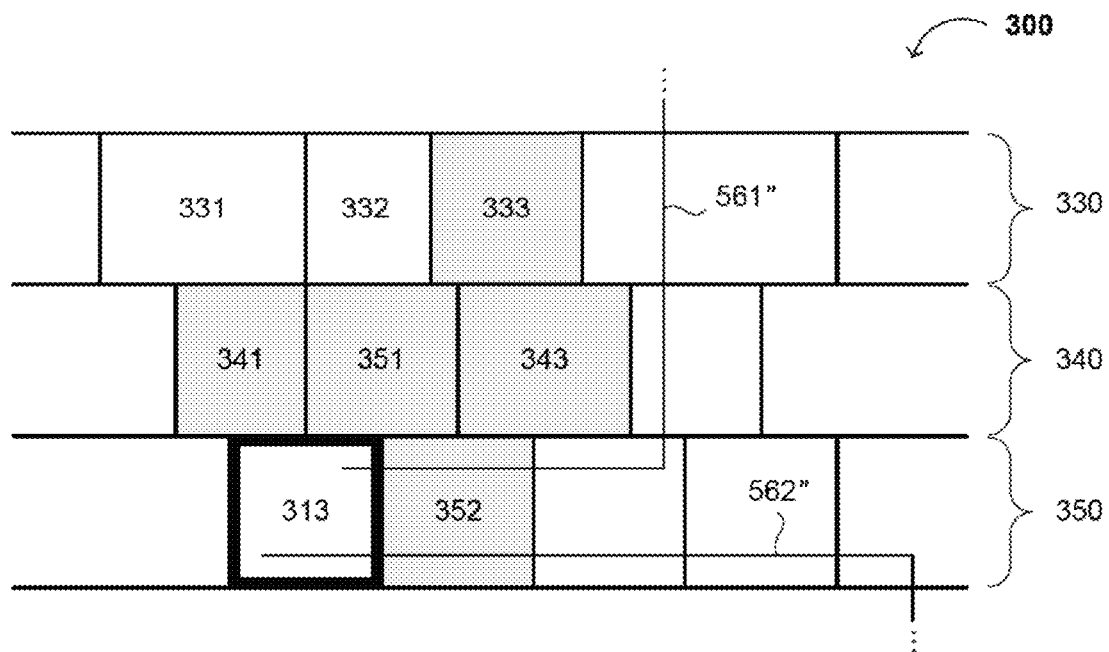

Alternatively, FIG. 5C shows an exemplary routing of nets 561" and 562" from cell 313 after it is swapped with cell 351. As shown in FIG. 5C, the length of both nets 561" and 562" is increased by the swap, which will worsen the timing of the signal path containing cell 313. Therefore, the swap is not favorable or desirable.

Figure 5D:
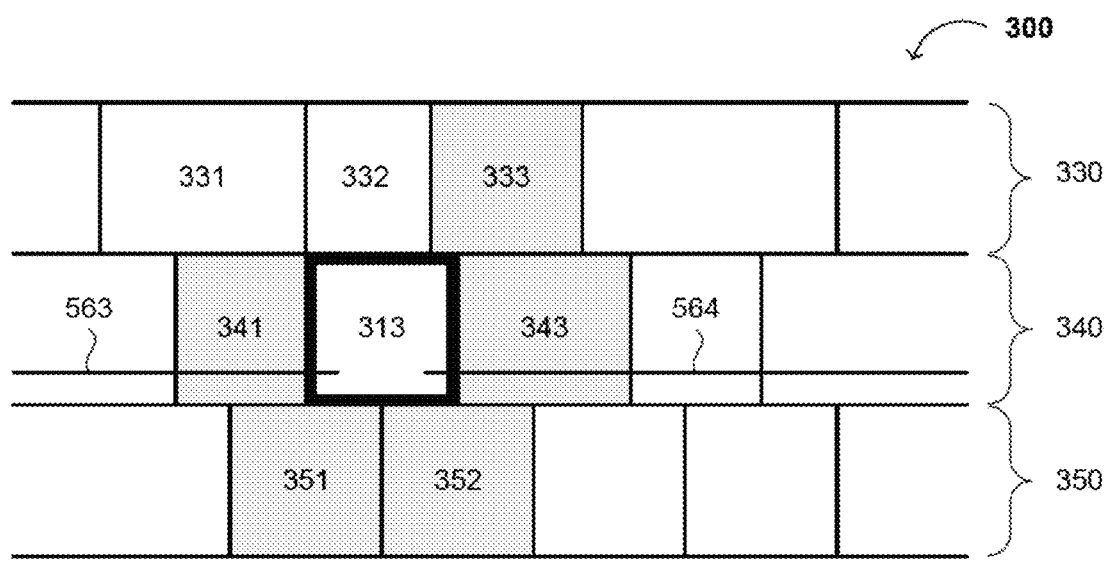

In another possible outcome, FIG. 5D shows an exemplary alternative routing of nets 563 and 564 from cell 313. If cell 313 is swapped with either cell 341 or 343, then the total length of nets 563 and 564 will not be altered. Thus, the timing of the signal path would not be substantially changed (either for better or worse). Referring back to FIG. 4, at 411, the method may include determining whether a total length of the nets coupled to the selected cell is shorter after performing the swap. Alternatively, the method may include determining whether a total of capacitance, resistance or inductance of the nets coupled to the selected cell is smaller after performing the swap. Thereafter, the method proceeds to 412 to determine whether the swap causes violations in other signal paths.

At 412, the method determines whether the swap causes timing violations in any affected signal paths. For example, in order to route nets to the swapped cell locations, the nets of at least the original signal path cell and signal path(s) of the swapped cell (e.g., an adjacent cell) are rerouted, if possible. In addition, other wires that cross over either of the swapped cells may be rerouted if routing conflicts arise when rerouting nets of signal paths including the analyzed cells. Therefore, for each signal path affected by the swap (e.g., for each signal path in which nets are re-routed to accommodate the swap), it may be determined whether the new routing causes a timing violation in the affected signal path(s). This determination may comprise performing conventional timing analysis on each affected signal path. However, performing such timing analysis can be computationally expensive.

In a preferred embodiment, the method includes determining boundary characteristics for nets in the other signal paths of the integrated circuit. These boundary characteristics of the nets may include, for example, a maximum capacitance for the nets, individually and/or collectively. Thus, at 412, new characteristics may be calculated for affected nets in the other signal paths, and it may be determined whether the new characteristics are within the boundary characteristics for the affected nets (e.g., the capacitances of the affected nets after re-routing may be calculated or determined, then compared to the respective maximum capacitance[s]). It has been found that the method(s) of determining boundary characteristics described in U.S. Provisional Patent Application No. 61/349,798, filed on May 28, 2010 and contemporaneously-filed U.S. patent application Ser. No. 13/149,230, the relevant portions of which are incorporated herein by reference, are effective and computationally efficient for this task.

If, at 412, it is determined that the swap does not cause timing violations in other signal paths, then the desirable swapped pair are stored at 413 (e.g., by storing references to the swappable cells in a new data structure, setting a flag in an existing data structure, and/or storing the relevant information in another appropriate way). The method then proceeds to 414 to complete the iteration for the current swappable pair and to determine whether there are any additional swappable pairs. When it is determined that there are no additional swappable pairs to analyze at 414, the method proceeds to 420 to perform the favorable or desirable swaps by re-placing the desirable swapped pairs of cells in the swapped locations and re-routing the wires corresponding to the affected nets in the layout in accordance with the desirable swap (e.g., re-routing nets coupled to the selected and adjacent cells, as well as re-routing nets in other signal paths to accommodate the swap).

The present method is particularly advantageous for improving the timing of pre-placed and pre-routed signal paths. Thus, the present invention also relates to determining whether a signal path (e.g., a signal path that has been placed and routed by conventional means) violates a timing constraint and, if the signal path violates the timing constraint, performing the present method(s) on the signal path (e.g., determining swappable pairs for a subset of cells in the signal path as shown in method 200 and then determining whether the swaps are desirable as shown in method 400).

Exemplary Software

A further aspect of the invention relates to software configured to perform one or more of the present methods. The software may be embodied in a computer readable medium (which may be tangible) or waveform comprising a computer executable set of instructions. For example, the software may be stored as executable code, machine object code components, and/or as software source code (e.g., in C, C++, Java, or any other appropriate programming language) on magnetic storage media (e.g., hard disks), flash storage, optical storage, or other physical computer readable media or in a computer readable waveform for transmission on a network or other medium of communication.

Figure 6:
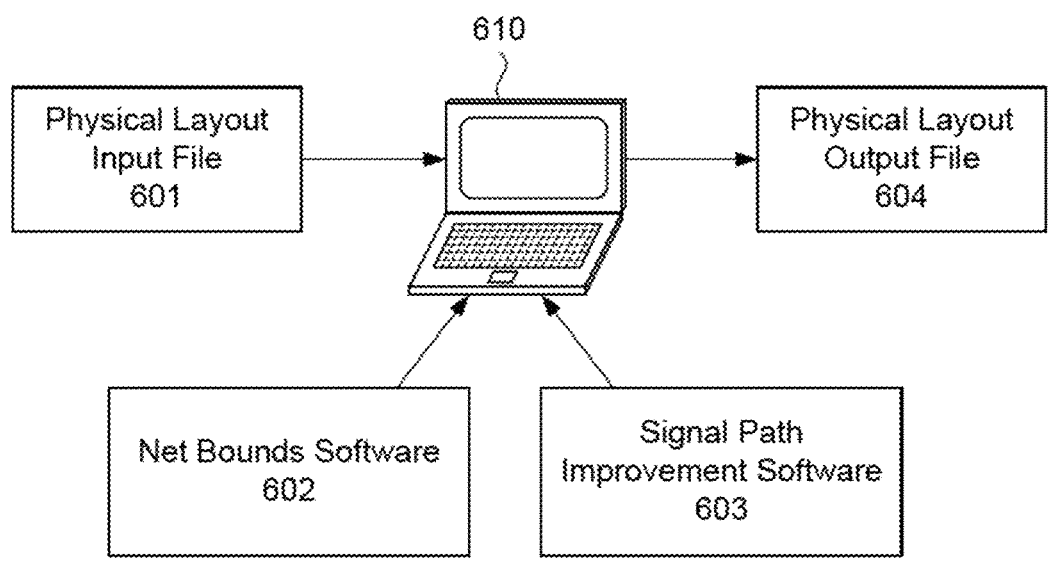
FIG. 6 is a diagram showing a system adapted for use with embodiments of the present invention.

Referring now to FIG. 6, an exemplary system employing the present software is shown. Computer 610 may load and execute signal path improvement software 603 implementing the present methods. Computer 610 may also load and execute net bounds software 602 configured to determine boundary characteristics of signal paths. An example of suitable net bounds software is described in U.S. Provisional Patent Application No. 61/349,798, filed May 28, 2010 and contemporaneously-filed U.S. patent application Ser. No. 13/149,230, the relevant portions of which are incorporated herein by reference. Computer 610 may load an input file 601 containing an initial physical layout of an integrated circuit, including an initial placement of each of the circuit blocks of the signal paths and an initial routing of each of the nets of the signal paths. The input file 601 may be a product of an initial place and route process performed on computer 610, or the product of a process performed on one or more other computers and transmitted to computer 610 (e.g., by attachment of a physical storage medium or by network transmission). The input file may comprise a conventional Design Exchange Format (DEF) file, a GDSII file, an OASIS file, or a LEF file.

Computer 610 may also load and execute signal path improvement software 603, which performs one or more of the methods described herein to improve and/or optimize cell placement and signal path routing as described herein. The signal path routing software may use boundary characteristics produced by net bounds software 602 (e.g., to determine boundary capacitances and/or other boundary characteristics for at least one of the nets of the integrated circuit). Computer 610 may also be configured to produce a physical layout output file 604 containing the new placement and routing as determined by software 603. The physical layout output file 604 may also comprise a conventional DEF, LEF, GDSII, or OASIS file, or may comprise any other file or data structure suitable for providing placement and routing information for an integrated circuit. In this fashion, a conventional ASIC type design flow including synthesis can be adapted for placement of cells and routing of signal paths between the cells in accordance with embodiments of the present invention.

Further examples of suitable systems, tools and/or methods in which the present invention is generally applicable include those described in, e.g., U.S. Pat. Nos. 6,080,201 and 5,798,936, the relevant portions of which are each incorporated herein by reference, and those commercially available from place-and-route software vendors such as Cadence Design Systems (e.g., the SILICON ENSEMBLE™, SILICON ENSEMBLE-PKS™, FIRST ENCOUNTER™, and NANO ENCOUNTER™ tools), Silicon Valley Research, Inc. (e.g., the QIC/APR™, GARDS™, SC™ and FLOORPLACER™ tools), Synopsys (e.g., the CHIP ARCHITECT™, DESIGN COMPILER™, and FLOORPLAN COMPILER™ tools) and Mentor Graphics (e.g., the AUTOCELLS™ tool).

CONCLUSION/SUMMARY

Thus, the present invention provides methods and software for automatically improving the timing characteristics of poorly performing signal paths without thereby causing timing violations in other signal paths on the same integrated circuit device. Embodiments of the present invention are computationally efficient relative to conventional methods, and have been found to produce timing improvements that otherwise could not be found in an automated fashion.

The foregoing descriptions of embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method placing and routing a signal path in an integrated circuit layout, said integrated circuit layout comprising a plurality of rows of cells, and said signal path comprising a plurality of said cells and combinational paths having at least one net between said cells in said signal path, said method comprising:

determining whether an adjacent cell is swappable with a selected cell, wherein said selected cell is one of said cells of said signal path, and said adjacent cell is swappable when said adjacent cell (i) is adjacent to said selected cell in a same row as said selected cell or (ii) is in an adjacent row in said integrated circuit layout and has a same width or a same available area as said selected cell;

using a computer or data processing system, determining a difference in a delay of said signal path by swapping positions of said swappable cell and said selected cell;

determining whether swapping said positions of said swappable cell and said selected cell (i) improves timing of the signal path and (ii) causes a timing violation in one or more other signal paths of said layout; and when swapping said positions of said swappable cell and said selected cell (i) does not cause a timing violation in the one or more other signal paths and (ii) improves timing of the signal path, re-placing said swappable cell and said selected cell in the swapped positions, and re-routing wires in affected nets in the combinational paths.

2. The method of claim 1, wherein determining whether said adjacent cell is swappable with said selected cell comprises determining whether nets coupled to said adjacent cell and said selected cell can be routed after swapping said positions of said adjacent cell and said selected cell.

3. The method of claim 1, wherein determining said difference in delay of said signal path comprises determining whether one or more nets coupled to said selected cell are shorter after swapping said positions of said swappable cell and said selected cell.

4. The method of claim 1, wherein determining said difference in delay of said signal path comprises determining whether a total length of nets coupled to said selected cell is shorter after swapping said positions of said swappable cell and said selected cell.

5. The method of claim 1, further comprising determining boundary characteristics for nets in said one or more other signal paths.

6. The method of claim 5, wherein said boundary characteristics comprise boundary capacitances.

7. The method of claim 5, wherein determining whether swapping said positions of said swappable cell and said selected cell causes said difference in delay comprises:

calculating new characteristics for affected nets in said one or more other signal paths after performing said swap; and determining whether said new characteristics are within said boundary characteristics for said affected nets.

8. The method of claim 7, wherein said affected nets are nets in said one or more other signal paths that are affected by re-routing nets coupled to said selected cell and said swappable cell.

9. A method of placing and routing, said method comprising:

determining that at least one signal path in said integrated circuit layout violates a timing constraint; and performing the method of claim 1 on said at least one signal path.

10. The method of claim 1, comprising determining whether any of a plurality of adjacent cells are swappable with said selected cell, wherein said integrated circuit layout includes (i) at least one swappable cell adjacent to said selected cell in the same row as said selected cell and (ii) at least one swappable cell in said adjacent row that has the same width or the same available area as said selected cell.

11. The method of claim 1, wherein said swappable cell is in an adjacent row in said integrated circuit layout and has the same width as said selected cell.

12. A non-transitory computer readable medium comprising a computer executable set of instructions adapted to place and route a signal path in an integrated circuit layout, said integrated circuit layout comprising a plurality of rows of cells, and said signal path comprising a plurality of said cells and combinational paths having at least one net between said cells, said instructions including:

determining whether an adjacent cell is swappable with a selected cell, wherein said selected cell is one of said cells of said signal path, and said adjacent cell is swappable when said adjacent cell (i) is adjacent to said selected cell in a same row as said selected cell or (ii) is in an adjacent row in said integrated circuit layout and has a same width or a same available area as said selected cell;

using said computer or a data processing system, determining a difference in a delay of said signal path by swapping positions of said swappable cell and said selected cell;

determining whether swapping said positions of said swappable cell and said selected cell (i) improves timing of the signal path and (ii) causes a timing violation in one or more other signal paths of said layout; and when swapping said positions of said swappable cell and said selected cell (i) does not cause a timing violation in the one or more other signal paths and (ii) improves timing of the signal path, re-placing said swappable cell and said selected cell in the swapped positions, and re-routing wires in affected nets in the combinational paths.

13. The computer readable medium of claim 12, wherein determining whether said adjacent cell can be swapped with said selected cell comprises determining whether nets coupled to is swappable and said selected cell can be routed after swapping said positions of said adjacent cell and said selected cell.

14. The computer readable medium of claim 12, wherein determining said difference in said delay of said signal path comprises determining whether a total length of nets coupled to said selected cell is shorter after swapping said positions of said swappable cell and said selected cell.

15. The computer readable medium of claim 12, further comprising one or more instructions adapted to determine boundary characteristics for nets in said one or more signal paths.

16. The computer readable medium of claim 15, wherein determining whether swapping said positions of said swappable cell and said selected cell causes said difference in delay comprises:

calculating new characteristics for affected nets in said one or more other signal paths after performing said swap; and determining whether said new characteristics are within said boundary characteristics for said affected nets.

17. The computer readable medium of claim 16, wherein said affected nets are nets in said one or more other signal paths that are affected by re-routing nets coupled to said selected cell and said swappable cell.

18. The computer readable medium of claim 12, further comprising instructions adapted to obtain an initial placement of each of said cells of said signal path and an initial routing of each of said nets of said signal path before said determining whether said adjacent cell is swappable with said selected cell, wherein obtaining said initial placement of each of said circuit blocks of said signal path and said initial routing of each of said nets of said signal path comprises reading and parsing an input file.

19. The computer readable medium of claim 12, further comprising instructions adapted to determine new routes of nets in said layout in accordance with swapping said positions of said swappable cell and said selected cell.

20. The computer readable medium of claim 12, comprising determining whether any of a plurality of adjacent cells are swappable with said selected cell, wherein said integrated circuit layout includes (i) at least one swappable cell adjacent to said selected cell in the same row as said selected cell and (ii) at least one swappable cell in said adjacent row that has the same width or the same available area as said selected cell.

\* \* \* \* \*